(12) United States Patent
Benveniste et al.

(10) Patent No.: US 8,223,637 B2
(45) Date of Patent: Jul. 17, 2012

(54) QUALITY-OF-SERVICE AND CALL ADMISSION CONTROL

(75) Inventors: Mathilde Benveniste, South Orange, NJ (US); Mahalingam Mani, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 1719 days.

(21) Appl. No.: 10/869,801

(22) Filed: Jun. 16, 2004

(65) Prior Publication Data

US 2005/0009533 A1  Jan. 13, 2005

Related U.S. Application Data

(60) Provisional application No. 60/478,821, filed on Jun. 17, 2003.

(51) Int. Cl.
*G06F 11/00* (2006.01)

(52) U.S. Cl. ........ 370/230; 370/328; 370/231; 370/229; 370/235; 370/395.2; 370/395.21

(58) Field of Classification Search ....... 370/229–238.1, 370/328, 395.2, 395.21
See application file for complete search history.

(56) References Cited

U.S. PATENT DOCUMENTS

| | | | |
|---|---|---|---|
| 6,708,034 B1 * | 3/2004 | Sen et al. ................. | 455/445 |
| 7,330,453 B1 * | 2/2008 | Borella et al. ............ | 370/338 |
| 7,366,780 B2 * | 4/2008 | Keller et al. ............. | 709/227 |
| 7,509,425 B1 * | 3/2009 | Rosenberg ............... | 709/227 |
| 7,532,613 B1 * | 5/2009 | Sen et al. ................. | 370/352 |
| 7,643,442 B1 * | 1/2010 | Calhoun .................. | 370/328 |
| 2002/0133600 A1 * | 9/2002 | Williams et al. ........ | 709/228 |
| 2003/0035401 A1 * | 2/2003 | Shaheen et al. .......... | 370/341 |
| 2003/0123388 A1 * | 7/2003 | Bradd ...................... | 370/230 |
| 2003/0134642 A1 * | 7/2003 | Kostic et al. ............. | 455/450 |
| 2003/0202469 A1 * | 10/2003 | Cain ......................... | 370/230 |
| 2004/0008632 A1 * | 1/2004 | Hsu et al. ................. | 370/252 |
| 2004/0082363 A1 * | 4/2004 | Hosein ..................... | 455/560 |

* cited by examiner

*Primary Examiner* — Wayne Cai
*Assistant Examiner* — Aung Win
(74) *Attorney, Agent, or Firm* — Chapin IP Law, LLC (57) ABSTRACT

An apparatus and methods are disclosed for enabling quality-of-service and call admission control for wireless telecommunications terminals without first submitting a traffic specification. The illustrative embodiment of the present invention is particularly advantageous for IEEE 802.11e networks because the 802.11e standard, which in its currently-drafted form contains provisions for terminals to submit traffic specifications, might not require 802.11e terminals to submit traffic specifications in the finalized 802.11e standard. Proper call admission control and, consequently, quality-of-service for wireless applications therefore might not be universally available to future 802.11e-compliant terminals unless one or more embodiments of the present invention are deployed.

10 Claims, 13 Drawing Sheets

QUALITY-OF-SERVICE AND CALL ADMISSION CONTROL

REFERENCE TO RELATED APPLICATIONS

This application claims the benefit of U.S. provisional patent application Ser. No. 60/478,821 filed 17 Jun. 2003, entitled "Method For Coupling Call Admission Control And Shared Bandwidth Management,", which is also incorporated by reference.

FIELD OF THE INVENTION

The present invention relates to telecommunications in general, and, more particularly, to quality-of-service (QoS) and admission control.

BACKGROUND OF THE INVENTION

Figure 1:
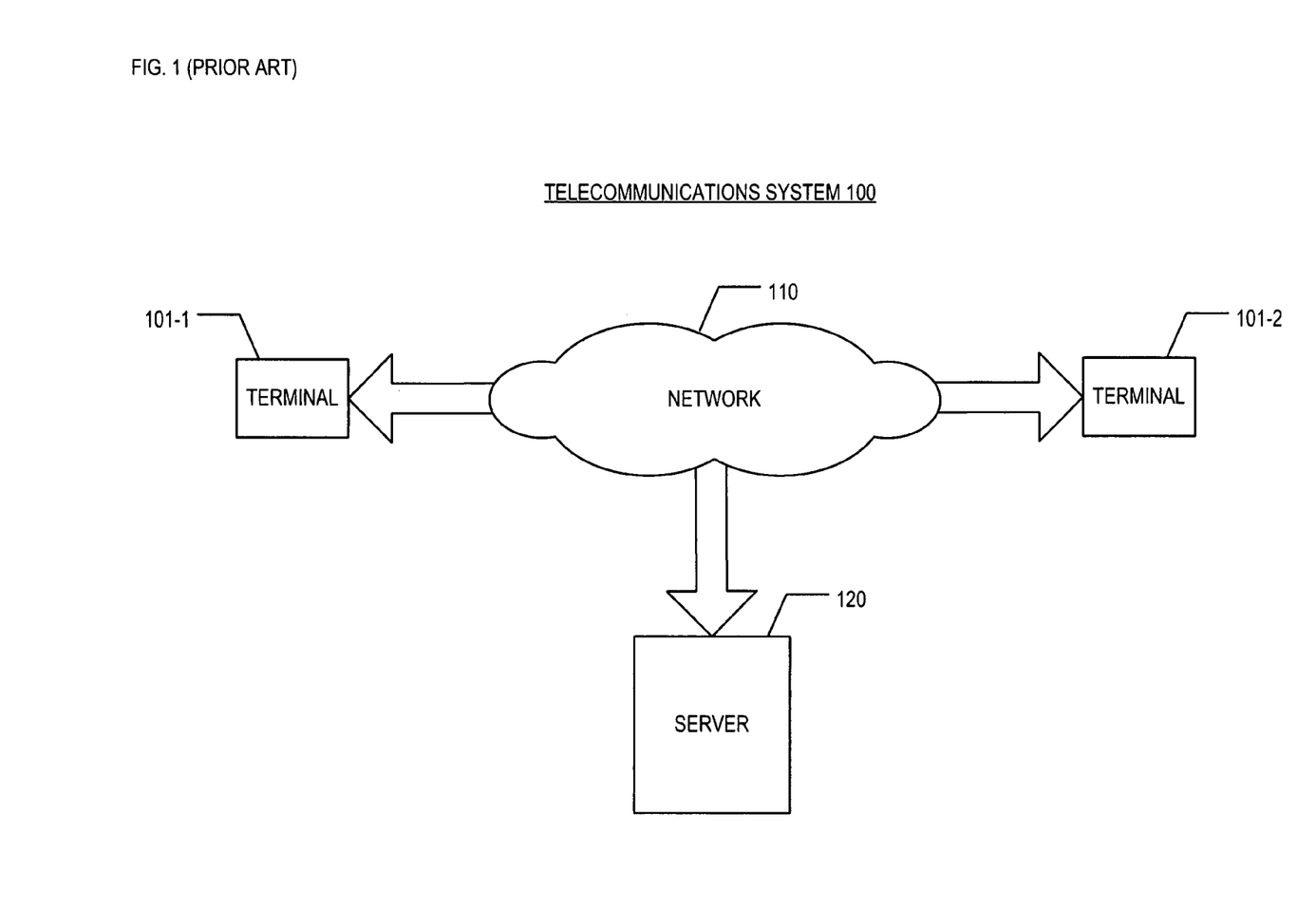
FIG. 1 depicts a schematic diagram of an exemplary telecommunications system in the prior art.

FIG. 1 depicts a schematic diagram of telecommunications system 100 in the prior art. Telecommunications system 100 comprises telecommunications terminals 101-1 and 101-2, network 110, and server 120, interconnected as shown. Network 110 is a communications network such as the Internet, the Public Switched Telephone Network (PSTN), etc., as is well-known in the art. Telecommunications terminals 101-1 and 101-2 are devices such as personal computers, telephones, etc. that communicate with other telecommunications terminals via network 110. Each telecommunications terminal has an associated contact identifier (e.g., telephone number, email address, Internet Protocol address, etc.) that uniquely identifies that terminal in the address space of telecommunications system 100. Server 120 (e.g., a Session Initiation Protocol [SIP] server, an SIP proxy server, etc.) maintains a list that maps user identifiers (e.g., user names, social security numbers, etc.) to contact identifiers.

Server 120 enables the users of telecommunications terminals to communicate as illustrated by the following example: A first user, the user of telecommunications terminal 101-1, enters a command into the terminal to place a call (e.g. voice call, email, text chat, video, etc.) to a second user. Telecommunications terminal 101-1 sends via an appropriate protocol (e.g., the Session Initiation Protocol [SIP], etc.) a message (e.g., an SIP INVITE message, etc.) server 120 that requests the contact identifier of the telecommunications terminal associated with the second user (i.e., the terminal that the second user is currently using). Server 120 then sends a response (e.g., an SIP acknowledgement [ACK], etc.) to telecommunications terminal 101-1 that indicates whether the second user can be reached, and if so, the associated contact identifier. Upon receiving the associated contact identifier, telecommunications terminal 101-1 sends one or more messages directly to telecommunications terminal 101-2 via network 110, and telecommunications terminal 101-2, which obtains the contact identifier of telecommunications terminal 101-1 via the received message(s), can respond directly to telecommunications terminal 101-2 via network 110.

Figure 2:
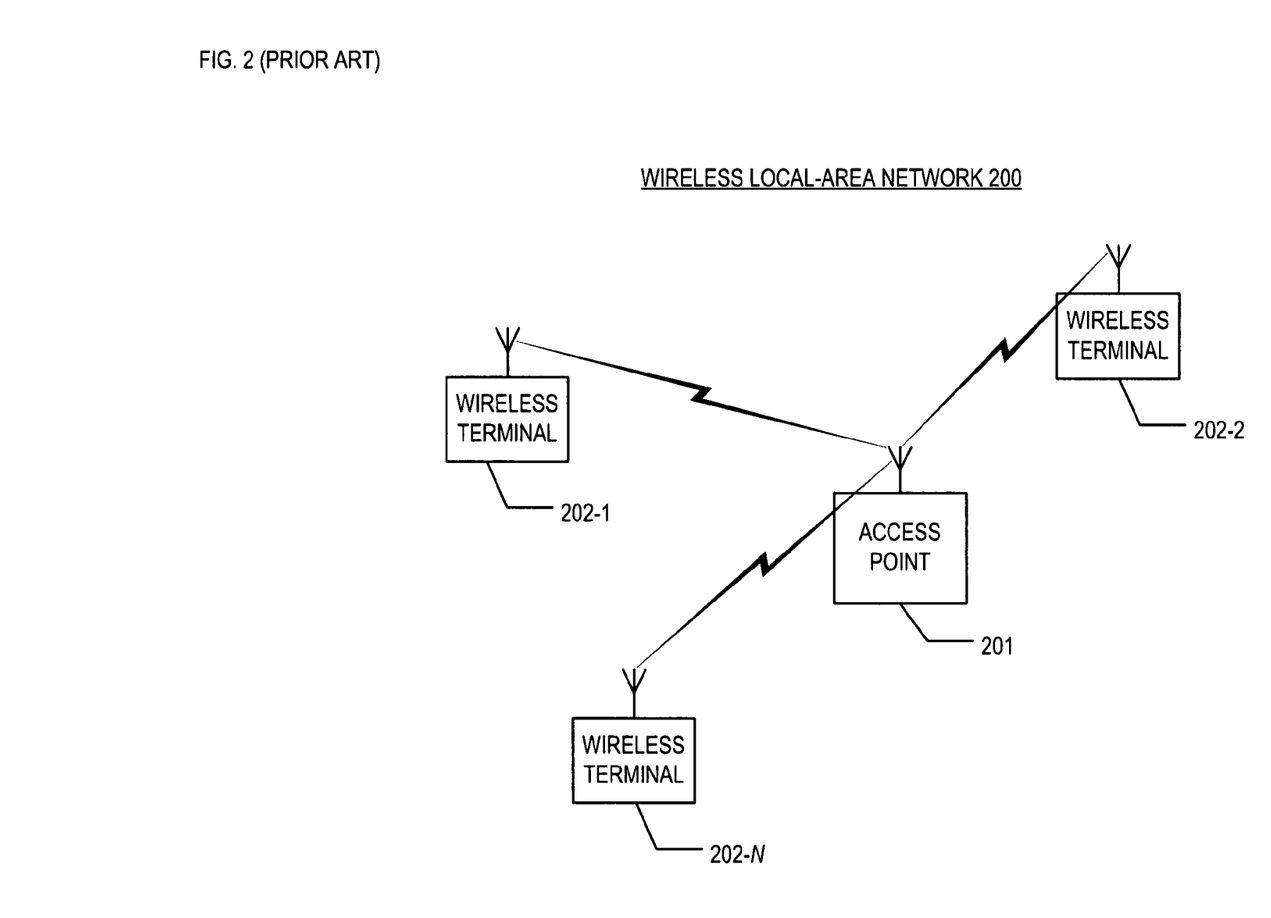
FIG. 2 depicts a schematic diagram of an exemplary wireless local-area network in the prior art.

FIG. 2 depicts a schematic diagram of wireless local-area network 200 in the prior art, which comprises access point 201 and wireless terminals 202-1 through 202-N, wherein N is a positive integer, interconnected as shown. Each wireless terminal 202-$i$, wherein i is member of the set of positive integers $\{1, \ldots N\}$, is a device (e.g., a notebook computer, personal digital assistant [PDA], tablet PC, etc.) that communicates wirelessly with other terminals in network 200 via access point 201.

Access point 201 and wireless terminals 202-1 through 202-N transmit messages over a shared-communications channel such that if two or more wireless terminals (or an access point and a wireless terminal) transmit messages simultaneously, then one or more of the messages can become corrupted (which results in a collision and the destruction of both messages). As a consequence, local-area networks typically employ protocols for ensuring that a wireless terminal or access point can gain exclusive access to the shared-communications channel for an interval of time in order to transmit messages without collisions.

Such protocols can be classified into two types: contention-based protocols, and contention-free protocols. In a contention-based protocol, wireless terminals 202-1 through 202-N and access point 201 compete to gain exclusive access to the shared-communications channel.

In a contention-free protocol, in contrast, a coordinator (e.g., access point 201, etc.) grants access to the shared-communications channel to one station at a time. One technique in which a coordinator can grant access to the shared-communications channel is polling. In protocols that employ polling, stations submit a polling request to the coordinator, and the coordinator grants stations exclusive access to the shared-communications channel sequentially in accordance with a polling schedule.

The Institute of Electrical and Electronics Engineers (IEEE) 802.11e specification is an emerging set of protocols that provides quality-of-service (QoS) for wireless local-area networks, in addition to contention-based and contention-free shared-communications channel access. Quality-of-service is an important consideration for wireless local-area networks given the serialization of communications imposed by the shared-communications channel, as well as the growing bandwidth requirements of various applications. An IEEE 802.11e-compliant wireless terminal can transmit to the wireless access point a request to add a traffic stream (ADDTS), accompanied with the following information:

(i) a traffic specification (TSPEC) that specifies one or more parameters of future traffic that will be generated by the terminal (e.g., a temporal period for periodic traffic streams, a minimum service interval, a maximum service interval, etc.); and (ii) a traffic class that indicates the priority of future traffic.

The access point will either accept or decline the request, depending on the available bandwidth. If the request is declined the station may not transmit with the privileges of the traffic class indicated in the TSPEC. The ability of an access point to decline an ADDTS request enables bandwidth management, also known as "over-the-air admission control." request enables bandwidth management, also known as "over-the-air admission control".

SUMMARY OF THE INVENTION

The present invention enables quality-of-service and over-the air call admission control for wireless terminals that engage in communications without first submitting a traffic specification (TSPEC). The illustrative embodiment of the present invention is particularly advantageous for IEEE 802.11e networks because the 802.11e standard, which in its currently-drafted form contains provisions for terminals to submit traffic specifications, might not require 802.11e terminals to submit traffic specifications in the finalized 802.11e standard. Proper call admission control and, consequently, quality-of-service for wireless applications therefore might not be universally available to future 802.11e-compliant terminals unless one or more embodiments of the present invention are deployed.

The illustrative embodiment employs a gateway that connects to the wireless access points of one or more local-area networks (LANs) and sits between the LANs and a network (e.g., the Internet, the Public Switched Telephone Network (PSTN), etc.) that connects to a server (e.g., a Session Initiation Protocol [SIP] server, an SIP proxy server, etc.). In the illustrative embodiment, a first user's wireless terminal places a call to a second user by sending to its wireless access point a message that comprises: (i) a traffic stream description (e.g., an SIP Real-Time Protocol [RTP] payload type, etc.) that specifies the nature of a call (e.g., a voice telephone call, a video conference, a text-based instant message [IM], etc.), and (ii) a request for the contact identifier of the second user's telecommunications terminal. The message might also optionally include one or both of (iii) a traffic category, and (iv) a traffic specification. The wireless access point sends the message to the gateway for forwarding to the server. The gateway, before forwarding the message to the server, stores the traffic stream description (and if present, the traffic category and traffic specification) in a record associated with the call. In some embodiments, the gateway might include in the record a measure of communication resource usage of the shared-communications channel (e.g., channel capacity utilization, etc.) or might append this measure to the message before forwarding.

The server 120 then sends a response (e.g., an SIP acknowledgement [ACK], etc.), to the first user's telecommunications terminal via the network, gateway, and wireless access point that indicates whether the second user can be reached, and if so, the associated contact identifier. The gateway, upon receiving the response, intercepts the response instead of forwarding the response to the appropriate wireless access point. When the response contains a positive acknowledgement, the gateway consults the appropriate record and checks whether a traffic specification was provided for the call. If no traffic specification was provided, the gateway determines, based on the traffic stream description and measure of communication resource usage, whether the amount of communication resource (e.g., bandwidth, channel idleness, etc.) currently available is sufficient to support the call (i.e., whether the call should be admitted). The gateway then sends a message to the server that indicates whether the call is admitted, and the server proceeds accordingly.

A similar process occurs when a call is directed to a wireless terminal.

Although the illustrative embodiment of the present invention is disclosed in the context of IEEE 802.11e local-area networks, it will be clear to those skilled in the art how to make and use embodiments of the present invention for other kinds of networks and network protocols. In addition, the term "call," while normally used only in the context of telephone voice calls, will be used to encompass all manners of communication (e.g. email, text chat, video, etc.), and it will be clear to those skilled in the art how to make and use embodiments of the present invention for such alternative means of communication.

The illustrative embodiment comprises: (a) a receiver for receiving a first message from a server, wherein the first message is based on a second message that (i) is sent from a first telecommunications terminal to the server, and (ii) specifies a traffic stream description for a call initiated by a second telecommunications terminal and directed to the first telecommunications terminal, and wherein the first message comprises an estimated communication resource requirement for the call that is based on the traffic stream description for the call; (b) a processor for determining whether to admit the call based on (i) the estimated communication resource requirement for the call, and (ii) a measure of communication resource usage of a shared-communications channel associated with the first telecommunications terminal; and (c) a transmitter for transmitting a third message to the server that indicates whether the call is admitted.

DETAILED DESCRIPTION

For the purposes of the specification and claims, the term "traffic stream description" is defined as a datum that specifies (i) the nature of a traffic stream associated with a call (e.g., a voice traffic stream, a video stream, a text-based instant message [IM] traffic stream, etc.), and, optionally, (ii) one or more parameters associated with the traffic stream (e.g., periodicity, bandwidth requirements, latency tolerance, etc.)

For the purposes of the specification and claims, the term "call" is defined as communication between two or more terminals (e.g. a voice telephone call, an email, a text-based instant message [IM] session, a video conference, etc.).

For the purposes of the specification and claims, the term "communication resource usage" is defined as a datum that characterizes usage of a communication resource (e.g., bandwidth, channel idleness, etc.) associated with a communication medium.

Figure 3:
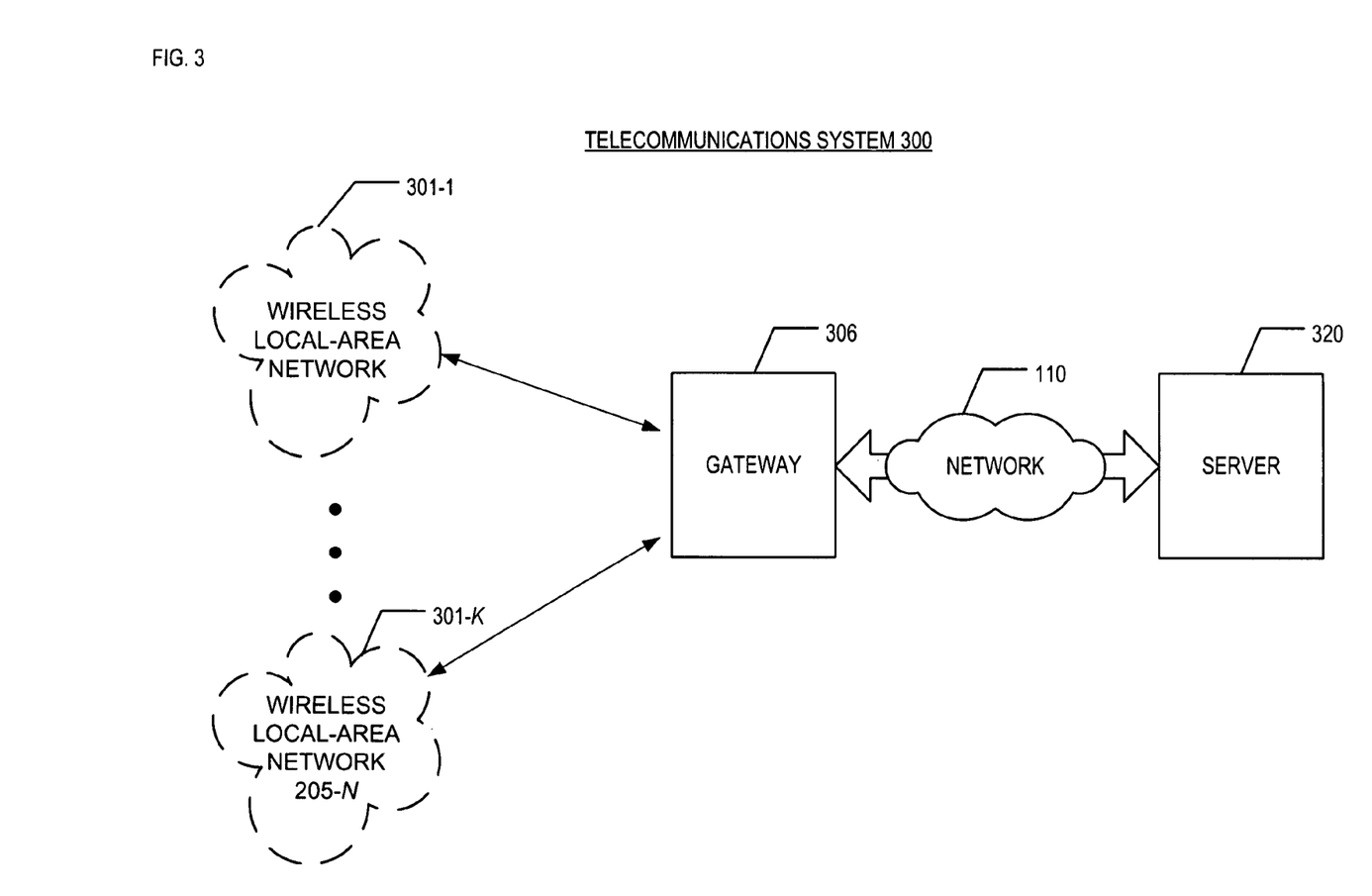
FIG. 3 depicts a schematic diagram of a telecommunications system that involves at least one wireless terminal, in accordance with the illustrative embodiment of the present invention.

FIG. 3 depicts a schematic diagram of telecommunications system 300 that involves at least one wireless terminal, in accordance with the illustrative embodiment of the present invention. Telecommunications system 300 comprises one or more wireless local-area networks 301-*i* through 301-K, where K is a positive integer; gateway 306; server 320; and network 110, as described above and with respect to FIG. 1; interconnected as shown.

Wireless local-area networks 301-*i* through 301-K, are similar to wireless local-area network 200 of FIG. 2, with the exception of different wireless terminals and wireless access points employed in lieu of terminals 202 and access point 201, respectively. Wireless local-area networks 301-*i* through 301-K are described in detail below and with respect to FIG. 4.

Gateway 306 connects wireless local-area networks 301-*i* through 301-K to network 110 in well-known fashion. In addition, gateway 306 performs logic, receives messages from wireless local-area networks 301-*i* through 301-K and from network 110, and transmits messages to wireless local-area networks 301-*i* through 301-K and to network 110, as described below and with respect to FIG. 6 and FIGS. 8 through 13.

Server 320 provides the functionality of server 110 in the prior art, and in addition, transmits special call-setup TSPEC (CS-TSPEC) messages as described below and with respect to FIGS. 7 through 13.

Figure 4:
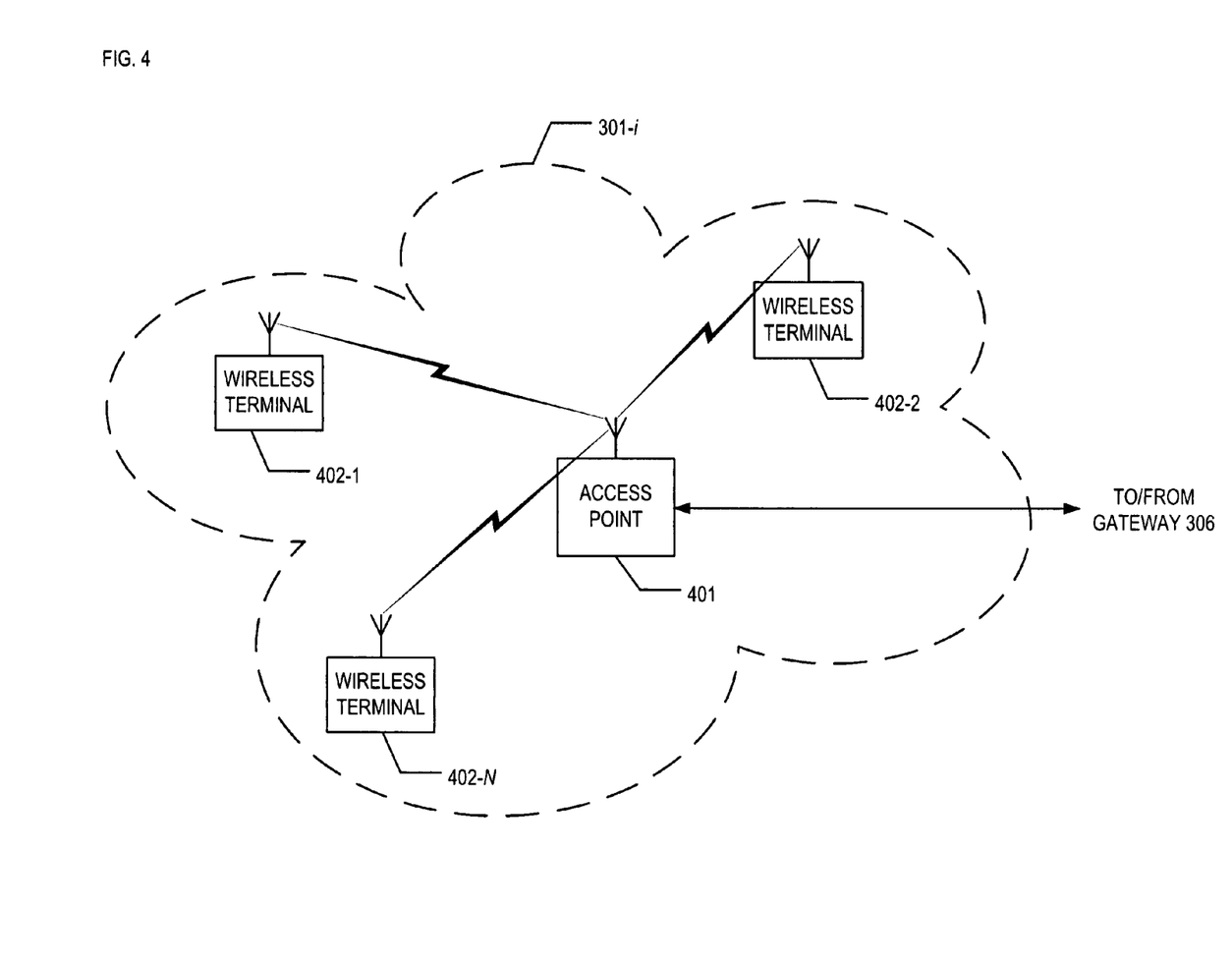
FIG. 4 depicts a schematic diagram of wireless local-area network 301-$i$, as shown in FIG. 3, in accordance with the illustrative embodiment of the present invention.

FIG. 4 depicts a schematic diagram of wireless local-area network 301-*i*, as shown in FIG. 3, in accordance with the illustrative embodiment of the present invention. Wireless local-area network 301-*i* comprises wireless access point 401, and wireless terminals 402-1 through 402-N, interconnected as shown.

Wireless access point 401 provides the functionality of access point 201 in the prior art, and in addition, appends information to call-setup messages sent from wireless terminals 202, as described below and with respect to FIGS. 8 through 13.

Wireless terminals 402-1 through 402-N provide the functionality of wireless terminals 302 in the prior art, and in addition, provided additional quality-of-service services in accordance with a particular protocol (e.g., IEEE 802.11e, etc.). In the illustrative embodiment, wireless terminals 402-1 through 402-N are IEEE 802.11e terminals, where each terminal 402-*i* might or might not provide a traffic specification (TSPEC) for call requests.

Figure 5:
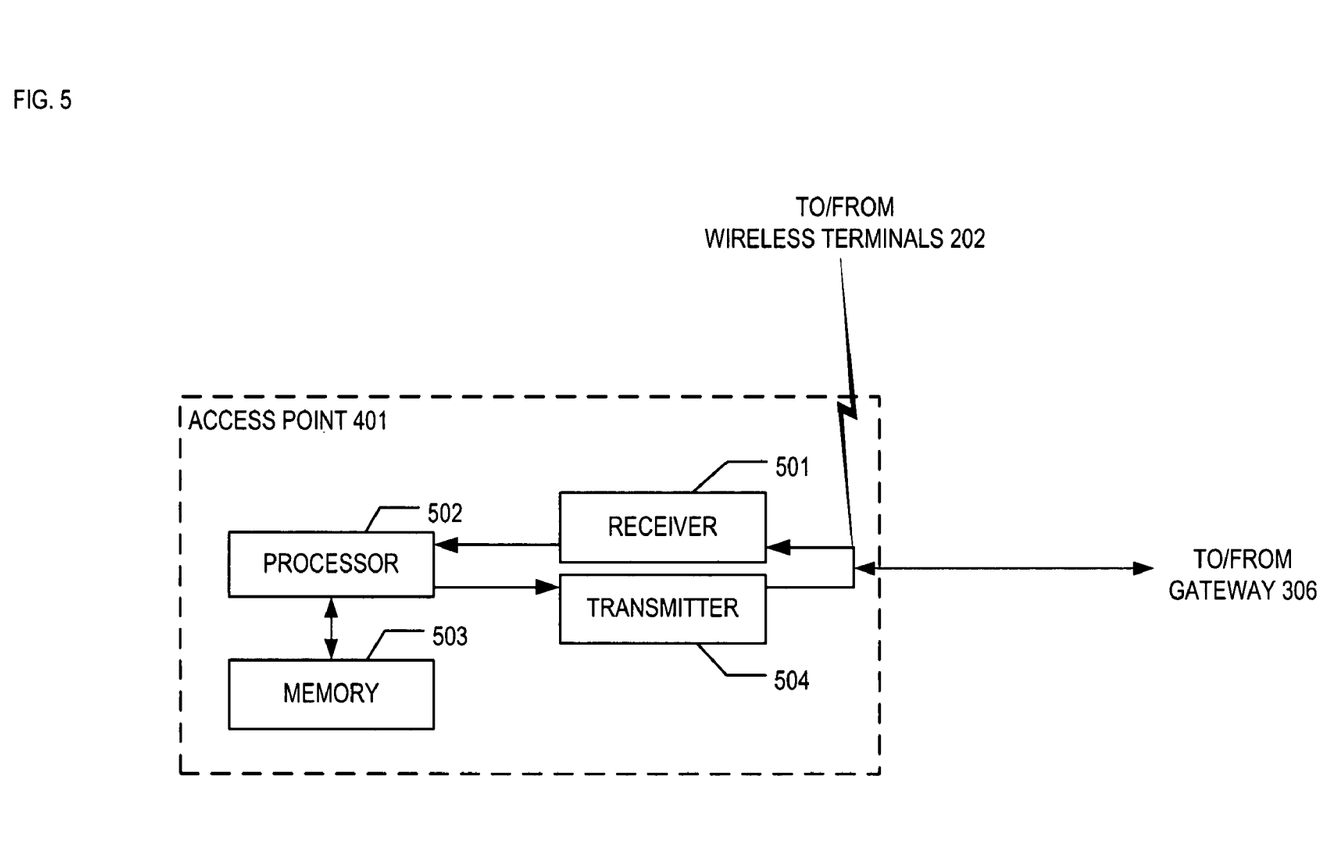
FIG. 5 depicts a block diagram of the salient components of wireless access point 401, as shown in FIG. 4, in accordance with the illustrative embodiment of the present invention.

FIG. 5 depicts a block diagram of the salient components of wireless access point 401, in accordance with the illustrative embodiment of the present invention. Wireless access point 401 comprises receiver 501, processor 502, memory 503, and transmitter 504, interconnected as shown.

Receiver 501 is a circuit that is capable of receiving messages from wireless terminals 402-1 through 402-N and from gateway 306, in accordance with FIGS. 8 through 13 below, and of forwarding the messages to processor 502. It will be clear to those skilled in the art how to make and use receiver 501.

Processor 502 is a general-purpose processor that is capable of executing instructions stored in memory 503, of reading data from and writing data into memory 503, and of executing the tasks described below and with respect to FIGS. 8 through 13. In some alternative embodiments of the present invention, processor 502 is a special-purpose processor (e.g., a network processor, etc.). In either case, it will be clear to those skilled in the art, after reading this disclosure, how to make and use processor 502.

Memory 503 is capable of storing programs and data used by processor 502, as is well-known in the art, and might be any combination of random-access memory (RAM), flash memory, disk drive, etc. It will be clear to those skilled in the art, after reading this specification, how to make and use memory 503.

Transmitter 504 is a circuit that is capable of receiving messages from processor 502, in well-known fashion, and of transmitting the messages to wireless terminals 402-1 through 402-N and to gateway 306 in accordance with FIGS. 8 through 13 below. It will be clear to those skilled in the art how to make and use transmitter 504.

Figure 6:
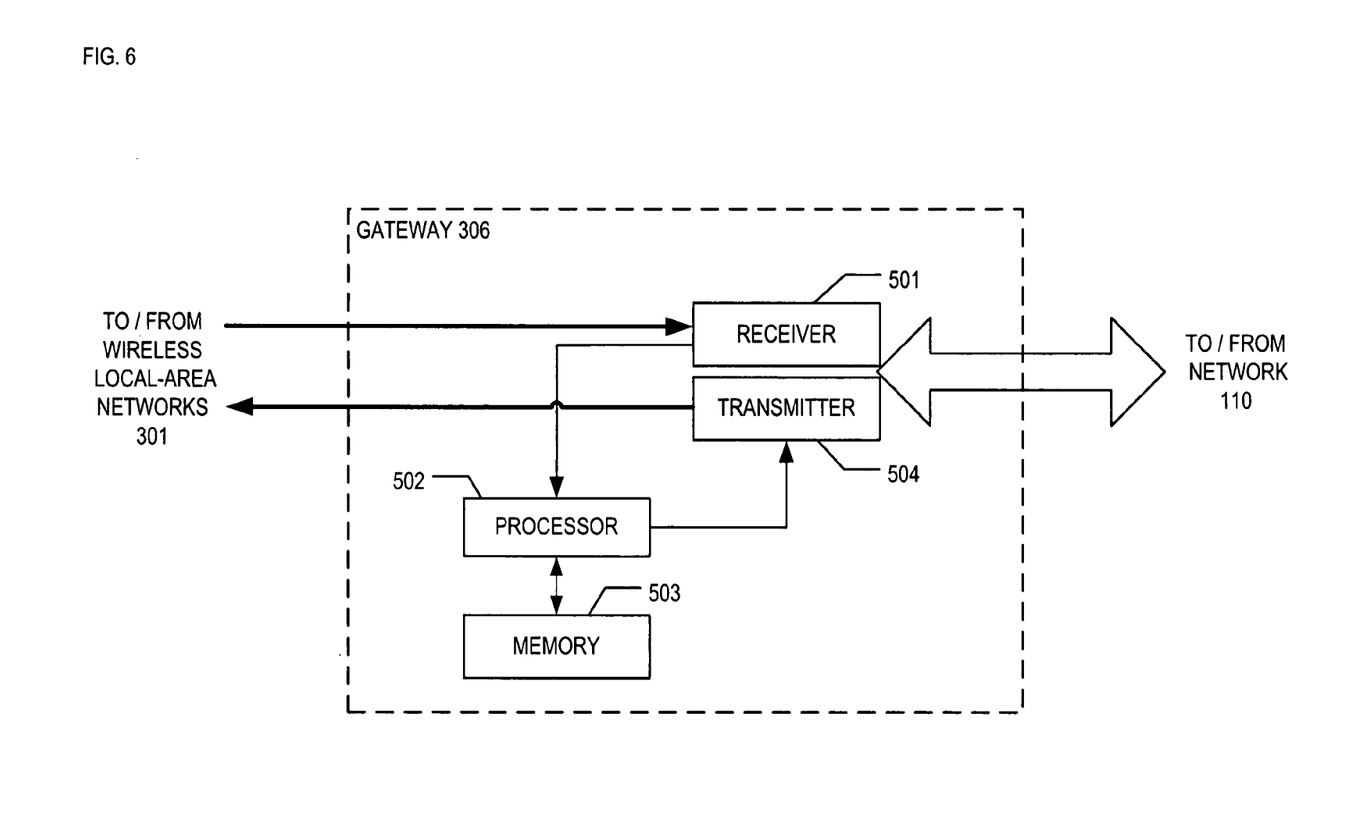
FIG. 6 depicts a block diagram of the salient components of gateway 306, as shown in FIG. 3, in accordance with the illustrative embodiment of the present invention.

FIG. 6 depicts a block diagram of the salient components of gateway 306 in accordance with the illustrative embodiment of the present invention. Gateway 306 comprises receiver 601, processor 602, memory 603, and transmitter 604, interconnected as shown.

Receiver 601 is a circuit that is capable of receiving messages from wireless local area networks 301 and from network 110 in accordance with FIGS. 8 through 13 below, and of forwarding these messages to processor 602. It will be clear to those skilled in the art how to make and use receiver 601.

Processor 602 is a general-purpose processor that is capable of executing instructions stored in memory 603, of reading data from and writing data into memory 603, and of executing the tasks described below and with respect to FIGS. 8 through 13. In some alternative embodiments of the present invention, processor 602 is a special-purpose processor (e.g., a network processor, etc.). In either case, it will be clear to those skilled in the art, after reading this disclosure, how to make and use processor 602.

Memory 603 is capable of storing programs and data used by processor 602, as is well-known in the art, and might be any combination of random-access memory (RAM), flash memory, disk drive, etc. It will be clear to those skilled in the art, after reading this specification, how to make and use memory 603.

Transmitter 604 is a circuit that is capable of receiving messages from processor 602, in well-known fashion, and of transmitting messages to local-area networks 200-*i* through 200-K and to network 110 in accordance with FIGS. 8 through 13 below. It will be clear to those skilled in the art how to make and use transmitter 604.

Figure 7:
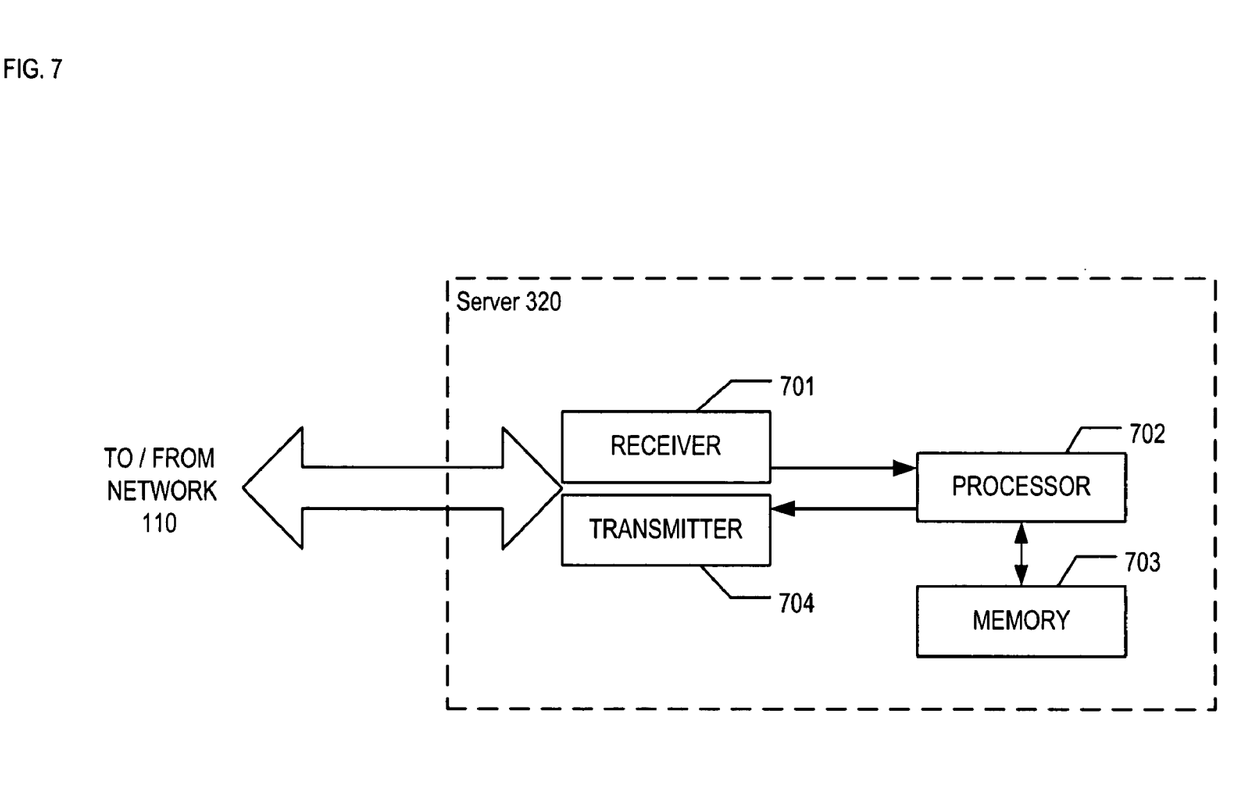
FIG. 7 depicts a block diagram of the salient components of server 320, as shown in FIG. 3, in accordance with the illustrative embodiment of the present invention.

FIG. 7 depicts a block diagram of the salient components of server 320, in accordance with the illustrative embodiment of the present invention. Server 320 comprises receiver 701, processor 702, memory 703, and transmitter 704, interconnected as shown.

Receiver 701 is a circuit that is capable of receiving messages from network 110 in accordance with FIGS. 8 through 13 below, and of forwarding these messages to processor 702. It will be clear to those skilled in the art how to make and use receiver 701.

Processor 702 is a general-purpose processor that is capable of executing instructions stored in memory 703, of reading data from and writing data into memory 703, and of executing the tasks described below and with respect to FIGS. 8 through 13. In some alternative embodiments of the present invention, processor 702 is a special-purpose processor (e.g., a network processor, etc.). In either case, it will be clear to those skilled in the art, after reading this disclosure, how to make and use processor 702.

Memory 703 is capable of storing programs and data used by processor 702, as is well-known in the art, and might be any combination of random-access memory (RAM), flash memory, disk drive, etc. It will be clear to those skilled in the art, after reading this specification, how to make and use memory 703.

Transmitter 704 is a circuit that is capable of receiving messages from processor 702, in well-known fashion, and of transmitting messages to network 110 in accordance with FIGS. 8 through 13 below. It will be clear to those skilled in the art how to make and use transmitter 704.

Figure 8:
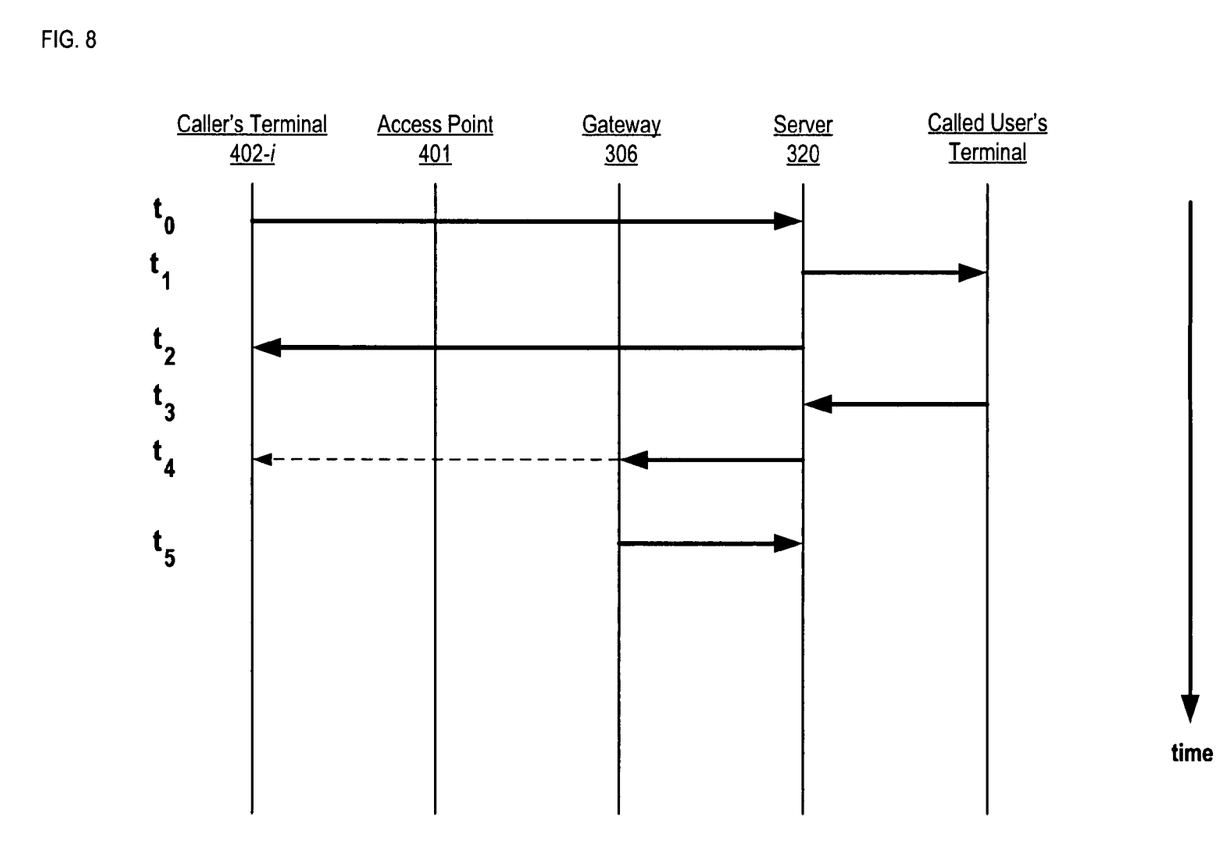
FIG. 8 depicts the message flows associated with a wireless terminal placing a call, in accordance with the illustrative embodiment of the present invention.

FIG. 8 depicts the message flows associated with the user of wireless terminal 402-*i* placing a call, in accordance with the illustrative embodiment of the present invention.

At time $t_0$, wireless terminal 402-*i*, the terminal of the user placing a call, sends a message via wireless access point 401 and gateway 306 to server 320 (e.g., an SIP INVITE message, etc.). The message comprises: (i) a traffic stream description (e.g., an SIP Real-Time Protocol [RTP] payload type, etc.) that specifies the nature of a call (e.g., a voice telephone call, a video conference, a text-based instant message [IM], etc.); and (ii) the user identifier of the person to be called. The message might also optionally include one or both of: (iii) a traffic category, and (iv) a traffic specification (TSPEC). Before transmitting the message to server 320, gateway 306 stores the traffic stream description (and if present, the traffic category and traffic specification) in a newly-created record associated with this call.

In some other embodiments of the present invention, wireless access point 401 might also append to the message (v) a measure of communication resource usage of the shared-communications channel (e.g., channel capacity utilization, etc.). In such embodiments, gateway 306, before transmitting the message to server 320, might also store the measure of communication resource usage in the newly-created record.

At time $t_1$, server 320 determines which terminal is currently associated with the user identifier of the called user (i.e., the "destination terminal"), and sends a message (e.g., an SIP OPTIONS message, etc.) to the destination terminal to determine the capabilities of the destination terminal (e.g., whether the destination terminal supports certain types of media, etc.).

At time $t_2$, server 320 sends a response to wireless terminal 402-*i* indicating that the server is attempting to set up the call, in well-known fashion.

At time $t_3$, the destination terminal sends a response to server 320 (e.g., an SIP OK message, etc.) in well-known fashion.

At time $t_4$, server 320 sends a message addressed to wireless terminal 402-*i* called a call-setup TSPEC (CS-TSPEC) request. In the illustrative embodiment, the CS-TSPEC is not a standard SIP message or an extension, as gateway 306 would not be able to interpret an SIP message addressed to wireless terminal 402-*i* that is subject to security encapsulation. In the illustrative embodiment, the CS-TSPEC message is sent to a special reserved User Datagram Protocol (UDP) port that gateway 306 monitors, as is well-understood in the art. In some other embodiments, a Transmission Control Protocol (TCP) socket might be used instead of UDP; however, this might result in decreased efficiency. Like the SIP Resource Reservation Protocol (RSVP), the CS-TSPEC mechanism provides out-of-band signaling for bandwidth reservation.

Gateway 306 intercepts the CS-TSPEC request and checks if wireless terminal 402-*i*, the calling terminal, included a traffic specification (TSPEC) in the message sent at time $t_0$. If not, gateway 306 determines, based on the traffic stream description and measure of communication resource usage stored at gateway 306, whether the amount of communication resource (e.g., bandwidth, channel idleness, etc.) currently available is sufficient to support the call (i.e., whether the call should be admitted).

At time $t_5$, gateway 306 sends a message to server 320 that indicates whether the call is admitted, in well-known fashion. In the illustrative embodiment, the message is sent to a special reserved UDP port at server 320, where it is awaited by a collocated daemon, synchronized with the pending invitation message, described below and with respect to FIG. 9.

If the call was admitted, the message flows of the illustrative embodiment proceed as described below and with respect to FIG. 9; otherwise, the message flows of the illustrative embodiment proceed as described below and with respect to FIG. 10.

Figure 9:
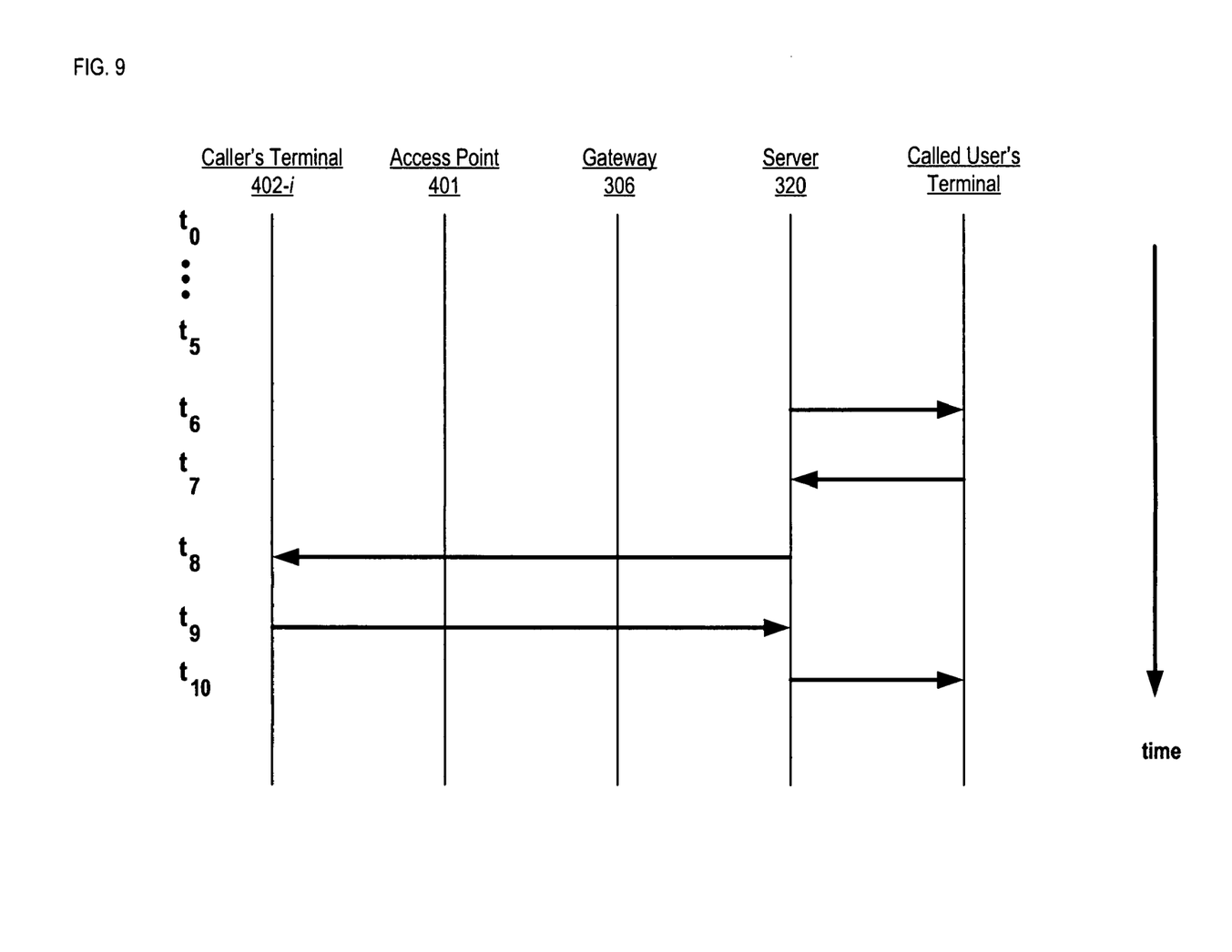
FIG. 9 depicts the message flows associated with an admitted call placed by a wireless terminal, in accordance with the illustrative embodiment of the present invention.

FIG. 9 depicts the message flows associated with an admitted call placed by a wireless terminal, in accordance with the illustrative embodiment of the present invention.

At time $t_6$, server 320 sends a message to the destination terminal that invites the user of the destination terminal to accept the call (e.g., an SIP INVITE message, etc.), in well-known fashion.

At time $t_7$, the destination terminal sends a response to server 320 indicating that the call is accepted (e.g., an SIP OK message, etc.), in well-known fashion.

At time $t_8$, server 320 sends a message to calling terminal 202-*i* indicating that the call is admitted (e.g., an SIP OK message, etc.), in well-known fashion.

At time $t_9$, calling terminal 202-*i* sends an acknowledgement to server 320, in well-known fashion.

At time $t_{10}$, server 320 sends an acknowledgement to the destination terminal, in well-known fashion. When the destination terminal receives the acknowledgement, calling terminal 202-*i* and the destination terminal can communicate as in the prior art.

Figure 10:
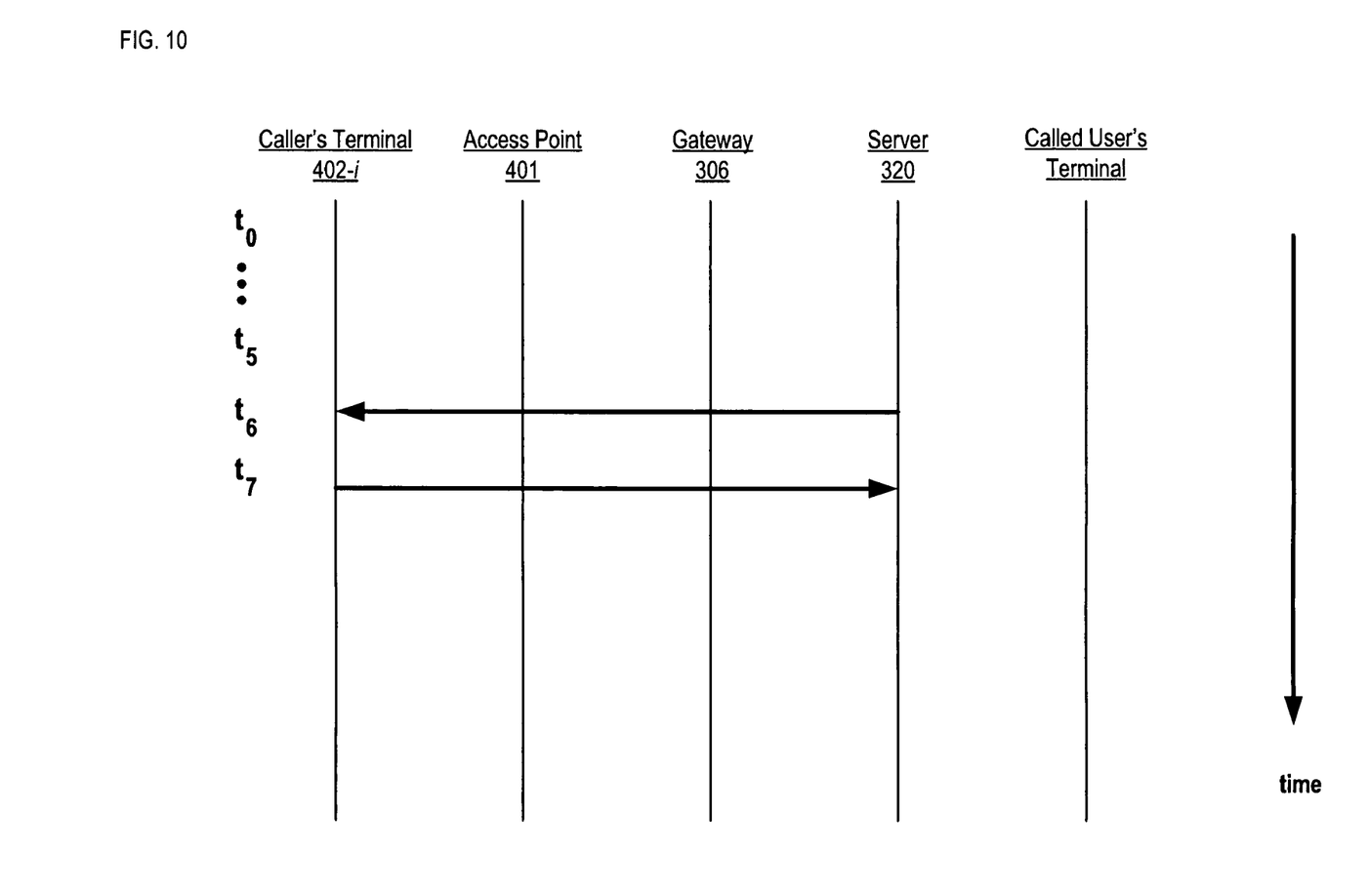
FIG. 10 depicts the message flows associated with a rejected call placed by a wireless terminal, in accordance with the illustrative embodiment of the present invention.

FIG. 10 depicts the message flows associated with a rejected call placed by a wireless terminal, in accordance with the illustrative embodiment of the present invention.

At time $t_6$, server 320 sends a message to calling terminal 202-*i* that indicates that the call was rejected (e.g., an SIP "488 NOT ACCEPTABLE" message, etc.), in well-known fashion.

At time $t_7$, calling terminal 202-*i* sends an acknowledgement to server 320, in well-known fashion.

Figure 11:
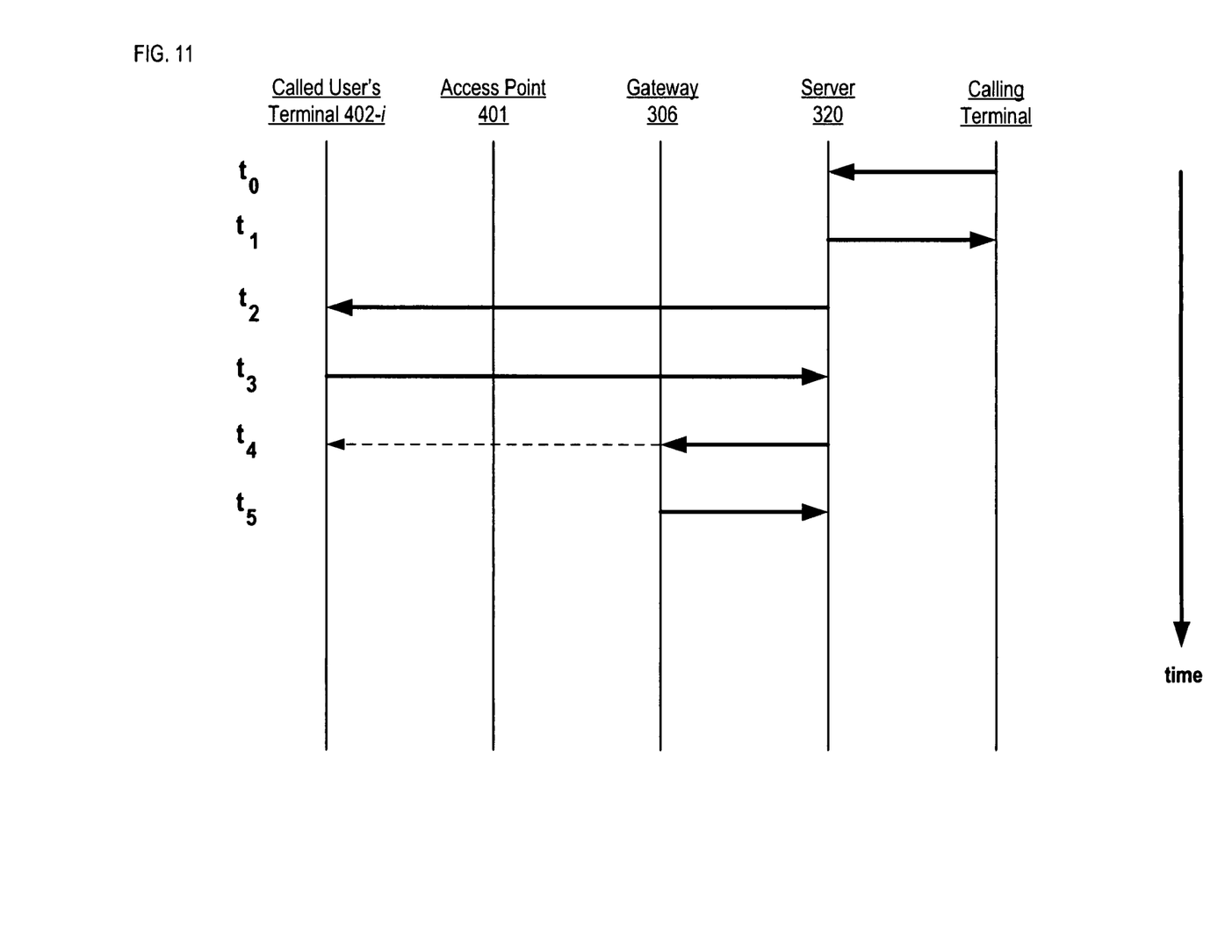
FIG. 11 depicts the message flows associated with a wireless terminal receiving a call, in accordance with the illustrative embodiment of the present invention.

FIG. 11 depicts the message flows associated with a wireless terminal receiving a call, in accordance with the illustrative embodiment of the present invention.

At time $t_0$, the terminal of the user placing a call, sends a message to server 320 (e.g., an SIP INVITE message, etc.). The message comprises: (i) a traffic stream description (e.g., an SIP Real-Time Protocol [RTP] payload type, etc.) that specifies the nature of a call (e.g., a voice telephone call, a video conference, a text-based instant message [IM], etc.); and (ii) the user identifier of the person to be called. If the calling terminal is a wireless terminal that is compliant with a quality-of-service protocol (e.g., IEEE 802.11e, etc.), the message might also optionally include one or both of: (iii) a traffic category, and (iv) a traffic specification (TSPEC).

At time $t_1$, server 320 determines which wireless terminal 402-*i* is currently associated with the user identifier of the called user, and sends a message to the calling terminal that indicates that the server is attempting to set up the call, in well-known fashion.

At time $t_2$, server 320 sends a message to wireless terminal 402-*i* (e.g., an SIP OPTIONS message, etc.) that indicates an incoming call, and comprises items (i) and (ii) above (and potentially one or both of items (iii) and (iv)) in well-known fashion.

At time $t_3$, wireless terminal 402-i sends, via wireless access point 401 and gateway 306, a response to server 320 (e.g., an SIP OK message, etc.) in well-known fashion. Gateway 306, before transmitting the message to server 320, stores the traffic stream description (and if present, the traffic category and traffic specification) in a newly-created record associated with this call.

In some other embodiments, wireless access point 401 might also append to this message (v) a measure of communication resource usage of the shared-communications channel (e.g., channel capacity utilization, etc.). In such embodiments, gateway 306, before transmitting the message to server 320, might also store the measure of communication resource usage in the newly-created record.

At time $t_4$, server 320 sends a special message directed to wireless terminal 402-i that requests a call-setup TSPEC (CS-TSPEC). In the illustrative embodiment, the CS-TSPEC message is sent to a special reserved User Datagram Protocol (UDP) port that gateway 306 monitors, as is well-understood in the art.

Gateway 306 intercepts the CS-TSPEC request and checks if there is a traffic specification (TSPEC) for the call. If not, gateway 306 determines, based on the traffic stream description and measure of communication resource usage stored at gateway 306, whether the amount of communication resource (e.g., bandwidth, channel idleness, etc.) currently available is sufficient to support the call (i.e., whether the call should be admitted).

At time $t_5$, gateway 306 sends a message to server 320 that indicates whether the call is admitted, in well-known fashion. In the illustrative embodiment, the message is sent to a special reserved UDP port at server 320, where it is awaited by a collocated daemon, synchronized with the pending invitation message, described below and with respect to FIG. 12.

If the call was admitted, the message flows of the illustrative embodiment proceed as described below and with respect to FIG. 12; otherwise, the message flows of the illustrative embodiment proceed as described below and with respect to FIG. 13.

Figure 12:
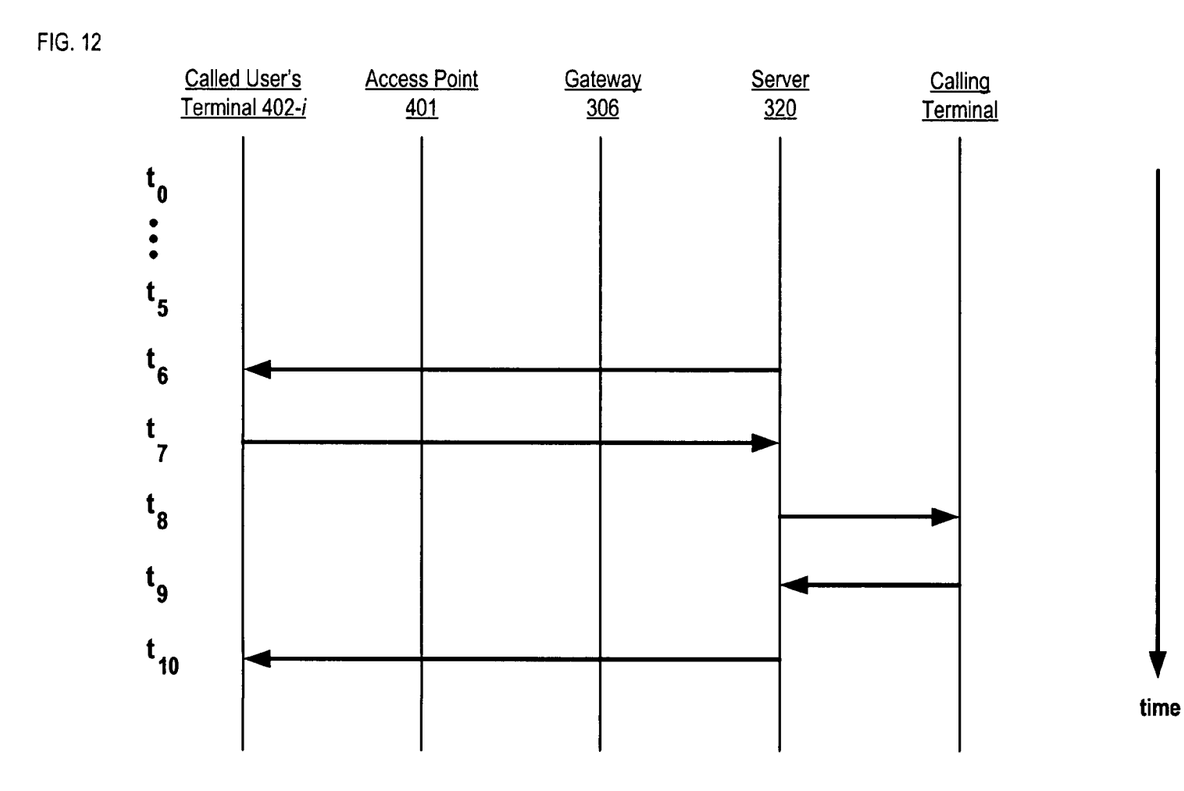
FIG. 12 depicts the message flows associated with an admitted call to a wireless terminal, in accordance with the illustrative embodiment of the present invention.

FIG. 12 depicts the message flows associated with an admitted call to a wireless terminal, in accordance with the illustrative embodiment of the present invention.

At time $t_6$, server 320 sends a message to wireless terminal 402-i that invites the user of the terminal to accept the call (e.g., an SIP INVITE message, etc.), in well-known fashion.

At time $t_7$, wireless terminal 402-i sends a response to server 320 indicating that the call is accepted (e.g., an SIP OK message, etc.), in well-known fashion.

At time $t_8$, server 320 sends a message to the calling terminal indicating that the call is admitted (e.g., an SIP OK message, etc.), in well-known fashion.

At time $t_9$, the calling terminal sends an acknowledgement to server 320, in well-known fashion.

At time $t_{10}$, server 320 sends an acknowledgement to wireless terminal 402-i, in well-known fashion. When wireless terminal 402-i receives the acknowledgement, the calling terminal and wireless terminal 402-i can communicate as in the prior art.

Figure 13:
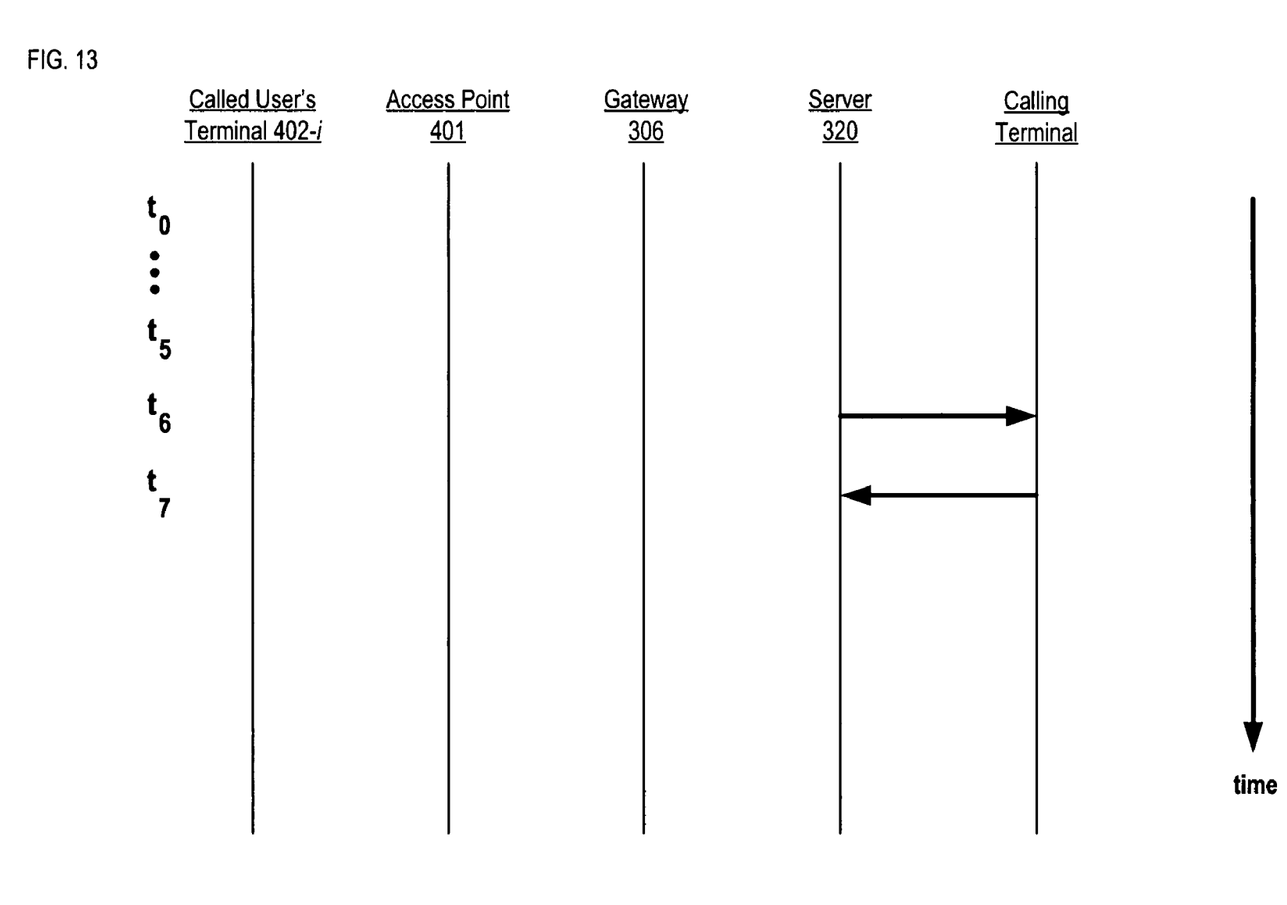
FIG. 13 depicts the message flows associated with a rejected call to a wireless terminal, in accordance with the illustrative embodiment of the present invention.

FIG. 13 depicts the message flows associated with a rejected call to a wireless terminal, in accordance with the illustrative embodiment of the present invention.

At time $t_6$, server 320 sends a message to the calling terminal that indicates that the call was rejected (e.g., an SIP "488 NOT ACCEPTABLE" message, etc.), in well-known fashion.

At time $t_7$, the calling terminal sends an acknowledgement to server 320, in well-known fashion.

As will be well-understood by those skilled in the art, when both the calling terminal and the called terminal are wireless terminals, the message flows associated with the call will be a composite of the message flows of FIGS. 8 through 10 and FIGS. 11 through 13.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
   (a) a receiver for receiving a first message from a server, wherein said first message is based on a second message that
      (i) is sent from a first telecommunications terminal to said server, and
      (ii) specifies a traffic stream description for a call initiated by a second telecommunications terminal and directed to said first telecommunications terminal, and wherein said first message comprises an estimated communication resource requirement for said call that is based on said traffic stream description for said call, wherein said first message is directed to said first telecommunications terminal, and wherein said receiver intercepts said first message, such that said first message is not received at said first telecommunications terminal regardless of whether the call is admitted or not admitted, wherein said receiver is also for receiving said measure of communications resource usage of said shared-communications channel from a wireless access point that is associated with said shared-communications channel, and wherein said processor is also for estimating said measure of communications resource usage of said shared-communications channel;

(b) a processor for determining whether to admit said call based on
  (i) said estimated communication resource requirement for said call, and (ii) a measure of communication resource usage of a shared-communications channel associated with said first telecommunications terminal; wherein said receiver determines whether said first message contains a positive acknowledgment and when said first message does contain a positive acknowledgment then said receiver determines whether a traffic specification was provided for said message and when a traffic specification was not provided then said receiver determines, based on the traffic stream description and measure of communication resources usage, whether the amount of communication resource currently available is sufficient to support the call;
  and
(c) a transmitter for transmitting a third message to said server that indicates whether said call is admitted.

2. The apparatus of claim 1 wherein said server is for establishing communications between telecommunications terminals.

3. The apparatus of claim 2 wherein said server is one of a Session Initiation Protocol server and a Session Initiation Protocol proxy server.

4. The apparatus of claim 1 wherein said call comprises packets transmitted periodically from said second telecommunications terminal to said first telecommunications terminal.

5. The apparatus of claim 1 wherein said call comprises packets transmitted periodically from said first telecommunications terminal to said second telecommunications terminal.

6. The apparatus of claim 4 wherein said call also comprises packets transmitted periodically from said second telecommunications terminal to said first telecommunications terminal.

7. The apparatus of claim 1 wherein said processor's estimating said measure of communications resource usage of said shared-communications channel is based on at least one message received from a wireless access point that is associated with said shared-communications channel.

8. The apparatus of claim 1 wherein said first message comprises a SIP acknowledgement message and wherein said second message comprises a SIP invite message.

9. An apparatus comprising:
(a) a receiver for receiving a first message from a server, wherein said first message is based on a second message that
  (i) is sent from a first telecommunications terminal to said server, and
  (ii) specifies a traffic stream description for a call initiated by said first telecommunications terminal and directed to a second telecommunications terminal, and
  wherein said first message comprises an estimated communication resource requirement for said call that is based on said traffic stream description for said call, wherein said first message is directed to said first telecommunications terminal, and wherein said receiver intercepts said first message, such that said first message is not received at said first telecommunications terminal regardless of whether the call is admitted or not admitted, wherein said receiver is also for receiving said measure of communications resource usage of said shared-communications channel from a wireless access point that is associated with said shared-communications channel, and wherein said processor is also for estimating said measure of communications resource usage of said shared-communications channel;
(b) a processor for determining whether to admit said call based on
  (i) said estimated communication resource requirement for said call, and (ii) a measure of communication resource usage of a shared-communications channel associated with said first telecommunications terminal;
  wherein said receiver determines whether said first message contains a positive acknowledgment and when said first message does contain a positive acknowledgment then said receiver determines whether a traffic specification was provided for said message and when a traffic specification was not provided then said receiver determines, based on the traffic stream description and measure of communication resources usage, whether the amount of communication resource currently available is sufficient to support the call;
  and
(c) a transmitter for transmitting a third message to said server that indicates whether said call is admitted.

10. The apparatus of claim 9 wherein said first message comprises a SIP acknowledgement message and wherein said second message comprises a SIP invite message.

* * * * *